Jan. 17, 1961 W. T. BRACKEN 2,968,199
MOUNTING OF DRILL JIG BUSHINGS
Filed July 1, 1958

INVENTOR.
WARNER T. BRACKEN,
BY Carlson, Pitzner,
Hubbard & Wolfe
ATTORNEYS.

United States Patent Office 2,968,199
Patented Jan. 17, 1961

2,968,199

MOUNTING OF DRILL JIG BUSHINGS

Warner T. Bracken, Glenview, Ill., assignor to Acme Industrial Company, Chicago, Ill., a corporation of Illinois Filed July 1, 1958, Ser. No. 745,928

3 Claims. (Cl. 77—62)

The present invention relates generally to jigs used for facilitating drilling operations and, more particularly, to the mounting of drill bushings in a jig.

In recent years there has been a growing tendency for industry to form drill jigs of materials which are less expensive and more workable than conventionally used steel. In the aircraft industry particularly, plastic jigs have come into wide use.

Jigs made of plastic or similar materials are relatively quite soft as compared to steel, and therefore cylindrical drill bushings cannot be simply press fitted into place in a plastic jig as in the normal practice with steel jigs. A cylindrical bushing which is pressed into plastic would quickly work loose.

In order to securely fix drill bushings in softer materials such as plastic, bushings have been designed with serrated, rough knurled, or other irregularly configured outer surfaces so that they may be firmly locked in place when embedded in the relatively soft jig material. This has proven to be an unsatisfactory solution, however, since bushing suppliers have been forced to manufacture and stock not only standard cylindrical bushings in hundreds of sizes, but also the specially configured bushings for soft molds in the same hundreds of sizes. This problem has been magnified by the conflicting standards adopted by various users. That is, the outer configuration which is satisfactory to one user, may not be satisfactory to another.

It should also be emphasized that drill bushings are formed of very hard materials, usually special steels, and therefore it is extremely difficult and expensive to form complex outer surfaces on the bushings.

Accordingly, it is the general aim of this invention to provide a procedure for mounting drill bushings in jigs of soft materials which is decidedly more economical than heretofore known. A collateral object is to provide an economical mounting method and arrangement which firmly and effectively locks the drill bushings in place in the softer material of the jig.

It is, moreover, an object to provide a method and arrangement as characterized above which utilizes standard cylindrical drill bushings of the type also used in steel jigs, so that one inventory of variously sized bushings can be employed with jigs of either hard or soft materials. In this way, duplicate inventories of specially formed and expensive bushings for plastic jigs need not be maintained.

It is also an object to provide a method and arrangement of the above type which is extremely flexible so as to permit standard bushings to be readily adapted for meeting any set of standards covering the conformation of bushings intended for use in plastic jigs. It is a related object to permit such adaptation of a standard bushing to be easily and economically made.

Other objects and advantages of the invention will become apparent upon reading the following detailed description and upon reference to the drawings in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
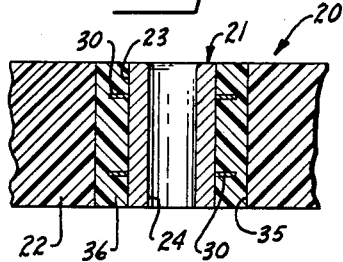
Figure 1 is a fragmentary sectional view taken through a bushing in a drill jig assembly which has been mounted in accordance with the present invention.

Turning first to Fig. 1, there is shown a portion of a drill jig assembly 20 having a drill bushing 21 mounted in a jig mold or base 22 formed of a relatively soft material such as plastic or wood. The bushing 21 is a standard cylindrical member having a smooth outer surface 23 and is of the type commonly used in steel jigs. As is conventional, the bushing 21 is formed of hard steel and is provided with a highly finished inner surface 24 intended to receive and guide a drill bit.

Figure 2:
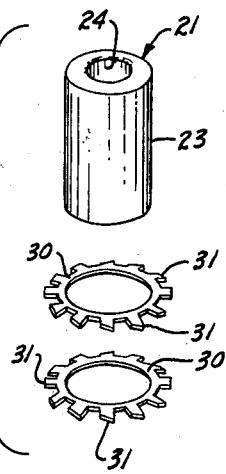
Fig. 2 is an exploded perspective view of the drill bushing assembly shown mounted in Fig. 1.

In accordance with the present invention, an annular retainer formed of easily workable material and having an irregular outer configuration is secured about the periphery of the bushing and is embedded into the side walls of a hole in the jig base in which the bushing is fitted. In the embodiment shown in Figs. 1 and 2, the retainer takes the form of readily available lock washers 30 of the type having radially extending projections 31. In the embodiment illustrated, two lock washers 30 are secured in spaced relation about the periphery of the bushing 21 by being press fitted onto the bushing. When the fit involves substantial interference, the lock washers may be deformed as a result of the pressing operation into slightly conical shape which does not affect its holding power.

The bushing 21, together with the retaining washers 30, form a bushing assembly which is fitted into a hole 35 formed in the jig base 22 and which has a diameter greater than the washers 30. With the bushing 21 being properly positioned relative to the washer, the space between the bushing assembly and the surrounding jig base is filled with a bonding material 36 which may take the form of a plastic cement. The bonding material 36 solidly surrounds the bushing 21 and the washers 30 so that the projections 31 of the washers are firmly embedded and the bushing 21 is positively locked in position.

Figure 5:
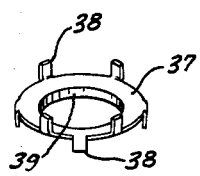
Fig. 5 is a perspective view of another form of retainer suitable for practicing the invention.

While in the preferred embodiment the retaining washers 30 are press fitted about the bushing 21, it is also contemplated that the retainers could be spot welded, shrink-fitted or otherwise secured to the bushings without departing from the invention. It will also be understood that only a single retaining washer 30, or more than two such washers, could be utilized to practice the invention, in accordance with the wishes of the jig manufacturer. Moreover, retainers having various special forms can be easily provided. For example, a member 37 having axially extending arms 38 (see Fig. 5) could be readily formed from easily worked material and used in the same manner as the washers 30. The member 37 includes a central skirt 39 which is formed by flanging the inner edge of the member. The skirt provides a greater surface area for engaging a bushing and thus assists in solidly securing the member onto the bushing. It will be understood that the washers 30 could also be formed with similar skirt portions.

Figure 3:
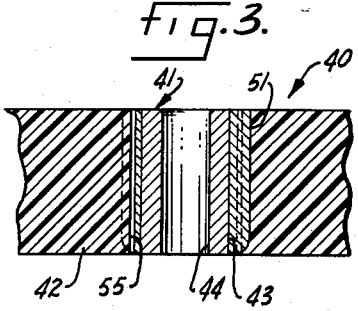
Fig. 3 is a fragmentary sectional view similar to Fig. 1 showing a modified form of mounting for the drill bushing.
Figure 4:
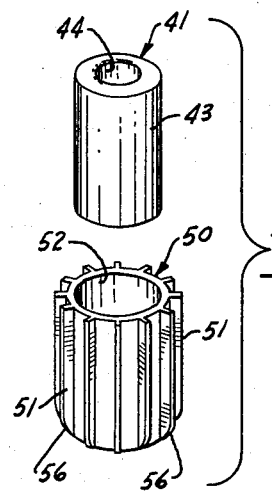
Fig. 4 is an exploded perspective view of the drill bushing assembly shown mounted in Fig. 3.

In the embodiment shown in Figs. 3 and 4, a drill jig assembly 40 includes a standard bushing 41 mounted in a jig base 42 in accordance with the present invention. The bushing 41, like the bushing 21, is provided with a cylindrical outer surface 43 and a highly finished inner surface 44 for guiding a drill bit.

In this embodiment, the retainer secured to the periphery of the bushing 41 takes the form of a sleeve 50 which has a plurality of integral, radially extending, axially disposed, ribs 51 space about its periphery. The inner diameter 52 of the sleeve 50 is only slightly greater than the diameter of the outer bushing surface 43, and it is contemplated that the sleeve 50 be secured about the periphery of the bushing 41 by being press fitted, spot welded or shrink fitted into place.

When the sleeve 50 is secured about the bushing 41 to form a bushing assembly, the assembly is pressed downwardly into a hole 55 formed in the jig base 42 so that the sleeve ribs 51 become embedded in the material forming the jig, and the bushing 41 firmly locked into place. To facilitate pressing of the bushing assembly into the jig base, the bottom ends of the ribs 51 are tapered as at 56. This embodiment requires that the hole in the base be accurately located which is to be contrasted to the first-described embodiment where the hold need only be in approximate location.

Figure 6:
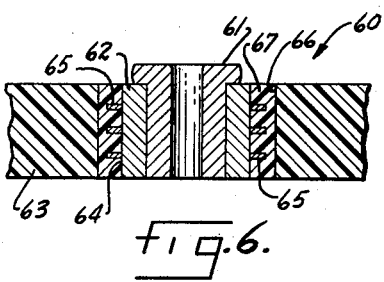
Fig. 6 is a fragmentary sectional view similar to Fig. 1 showing a bushing carried by a liner mounted in accordance with the invention.

The invention can also be practiced when it is desired to utilize replaceable bushings of the type which are removably mounted in liners secured in the jig base. A drill jig assembly 60 of this nature, shown in Fig. 6, includes a replaceable bushing 61 fitted in an annular liner 62 that is mounted in a jig base 63 in accordance with the invention. The bushing 61 is locked into the liner 62 in any suitable manner.

The liner 62, like the bushings 21 and 41 discussed above, is provided with a cylindrical outer surface 64, and in keeping with the invention, a plurality of retainers 65 are secured about the surface 64. The liner and its retainers 65 are set within an opening 66 in the jig base 63 and are surrounded with a bonding material 67 firmly embedding the liner, and hence the bushing 61, in place in the jig.

It will be appreciated that drill bushings, such as the bushings 21, 41, are made of extremely hard steels and and therefore are difficult and expensive to machine. Thus, by simply securing retainers such as the washers 30 or the sleeve 50 to the drill bushings, an irregular outer configuration necessary to firmly embed the bushing in a soft jig base is quickly and economically obtained. The washers 30 and the sleeve 50 are preferably made of easily formed materials, and, indeed, the washers 30 may well be standard, commercially available, economical elements. The internal diameter of the washers, contrary to expectation, need not be highly accurate. In the case of a ¾ inch bushing for example, the I.D. of the washer may be within a range of +0.005 to −0.005.

Therefore, by practicing the invention, a supplier of drill bushings need not maintain a large inventory of elaborately formed drill bushings intended to be used in plastic jigs. When bushings are required for use in a plastic jig, it is sufficient to fit and secure appropriately formed retainers about the periphery of properly sized standard bushings. Since these retainers can be economically formed and are easily secured in place, the resulting bushing assemblies may be manufactured at a cost substantially equal to that of the cylindrical bushings themselves.

It will also be appreciated that the present invention permits a wide variety of specially shaped bushing assemblies to be regularly provided by a bushing supplier. If a jig manufacturer desires an outer bushing configuration of a particular shape, it is a relatively simple matter to economically form a group of retainers having the particular shape desired and to mount them easily on standard bushings so that the resulting assembly will fully meet the user's requirements.

I claim as my invention:

1. In the method of firmly mounting an annular, hard steel, drill bushing in a jig of soft material by embedding the tops, sides and bottoms of radial projections from the bushing in the sides of a hole formed in the jig, the step of press fitting an annular retainer made of easily worked material and having a plurality of radially extending arms about the periphery of a standard cylindrical drill bushing so as to form a bushing having radial projections.

2. In the method of firmly mounting an annular, hard steel, drill bushing in a jig of soft material by embedding radial projections from the bushing in the sides of a hole formed in the jig, the step of press fitting a plurality of lock washers of the type having radially extending arms about the periphery of a standard cylindrical drill bushing, said washers being relatively spaced along the bushing so as to form a bushing having groups of radial projections.

3. A drill jig assembly, comprising, in combination, a jig base having a hole therethrough, an annular hard steel drill bushing fitted in said hole, a plurality of lock washers pressed fitted about, and thus snugly gripping, the periphery of said bushing so as to lie in said hole, said washers being spaced, from one another and having radially extending arms, and a bonding material filling said hole and solidly surrounding said bushing and said washers so as to lock the bushing in place.

References Cited in the file of this patent
UNITED STATES PATENTS

| | | |
|---|---|---|
| 2,400,318 | Rosan | May 14, 1946 |
| 2,558,814 | Briney | July 3, 1951 |
| 2,698,547 | Armacost | Jan. 4, 1955 |
| 2,728,249 | Stein et al. | Dec. 27, 1955 |